United States Patent [19]

Esh et al.

[11] Patent Number: 4,784,563
[45] Date of Patent: Nov. 15, 1988

[54] DUMP TRUCK UNLOADER

[75] Inventors: Stephen S. Esh, Morgantown; David B. Nolt, East Earl, both of Pa.

[73] Assignee: C. U. Stoltzfus Manufacturing, Inc., Morgantown, Pa.

[21] Appl. No.: 91,119

[22] Filed: Aug. 31, 1987

[51] Int. Cl.[4] .............................................. B65G 67/24
[52] U.S. Cl. .................................. 414/523; 239/675; 414/526
[58] Field of Search ............... 414/501, 502, 503, 507, 414/523, 526, 519, 520; 198/950; 239/675, 672

[56] References Cited

U.S. PATENT DOCUMENTS

| 2,442,743 | 6/1948 | Wester | 239/675 |
| 2,495,907 | 1/1950 | Reinking | 414/526 |
| 3,160,964 | 12/1964 | Boyer | 239/675 |
| 3,322,429 | 5/1967 | Cervelli | 239/675 |
| 3,420,452 | 1/1969 | Vaughan | 239/675 X |
| 3,559,894 | 2/1971 | Murray | 239/675 |
| 3,612,410 | 10/1971 | Steinke | 239/675 |
| 3,754,711 | 8/1973 | Gledhill | 239/675 |
| 3,768,737 | 10/1973 | Tobias | 239/675 |
| 4,326,673 | 4/1982 | Thene | 239/675 |

FOREIGN PATENT DOCUMENTS 577501 5/1946 United Kingdom ................ 239/675

Primary Examiner—Robert J. Spar
Assistant Examiner—Stuart J. Millman
Attorney, Agent, or Firm—Martin Fruitman

[57] ABSTRACT

An unloader for an unmodified dump truck which uses a temporarily installed conveyor along the flat bottom to dispense materials. Two struts of angle iron extend out from the conveyor to the bin sides and are pressed against the sides by threaded fittings. The struts hold the end of the conveyor in place, but permit simple and quick installation and removal.

6 Claims, 3 Drawing Sheets

DUMP TRUCK UNLOADER

SUMMARY OF THE INVENTION

This invention deals generally with sprinkling and diffusion and more specifically with a vehicle mounted, driven conveyor to feed a dispenser of granular material.

Truck mounted cinder spreaders are a common sight on the roads in winter in areas which experience snow. Moreover, in those areas it is common to hear of an unusually snowy winter causing budget problems for municipalities which must cope with snow on their roadways. One of the problems with budgets can be traced back to low capacity in the trucks that spread cinders, salt or sand on the roadways. Most such vehicles are built with hopper shaped bodies, that is with sloping sides, so that a large part of the potential truck volume is lost to use because it is under the sloping sides. This is most apparent in multipurpose vehicles when an entire hopper is placed within a dump truck body in order to convert it to the use of spreading cinders. The unused space is then highly visible because it is enclosed by the original dump body, but is absolutely useless.

These lowered capacities mean that drivers must more frequently return to reload the trucks, and, keeping in mind that the labor being used during snowstorms is frequently being paid a premium because of long shifts, the time spend traveling to reload can be a source of real savings.

The present invention achieves this saving by making use of the full volume of a dump truck for cinder spreading. Moreover, the present invention yields even greater economy because it can be installed in standard unmodified dump trucks in less than an hour. This benefit means that dump trucks, particularly those of contractors, can be used for other purposes right up to the time they are called in for snow work, and can then be put into service with little time for installation of the unloader.

All this is accomplished by the use of an open-top conveyor which is installed in a standard dump truck body by clamping it at the coal chute opening at the tailgate and anchoring it at its opposite end, the frontmost end of the truck body, with struts which reach out to the truck body sides. The struts are then wedged against the sides with a simple threaded fitting.

Although the conveyor is located on the flat floor of the dump body, it is possible to virtually completely empty the body with it. This is done by occasionally lifting the dump body, as if to dump the load. However, with the tailgate latched shut, the action merely relevels the load so that the unloader can continue to function and thus act on material which was previously inaccessible because it was located at the top of the slope which normally forms. It is not necessary to run with the dump body lifted. All that is required is that the body be lifted occasionally and immediately lowered again.

The present invention therefore makes it possible to install an unloader on a standard dump truck only after the truck has been called into service and to use the full capacity of the truck body to spread cinders on the highways with fewer trips for reloading. Moreover, if the truck is to be completely unloaded to take it out of service, it is not necessary to use the unloader to slowly accomplish the unloading. In fact, even with the conveyor installed, when the tailgate is unlatched it will open enough so that when the dump body is lifted the load will flow out through the tailgate in the conventional manner.

The invention therefore furnishes an extremely versatile cinder unloading system for use with a spreader which can be quickly installed or removed from a standard dump truck body and retains the full volume of the dump body in use, so that the truck can be utilized to its full capacity.

DETAILED DESCRIPTION OF THE INVENTION

Figure 1:
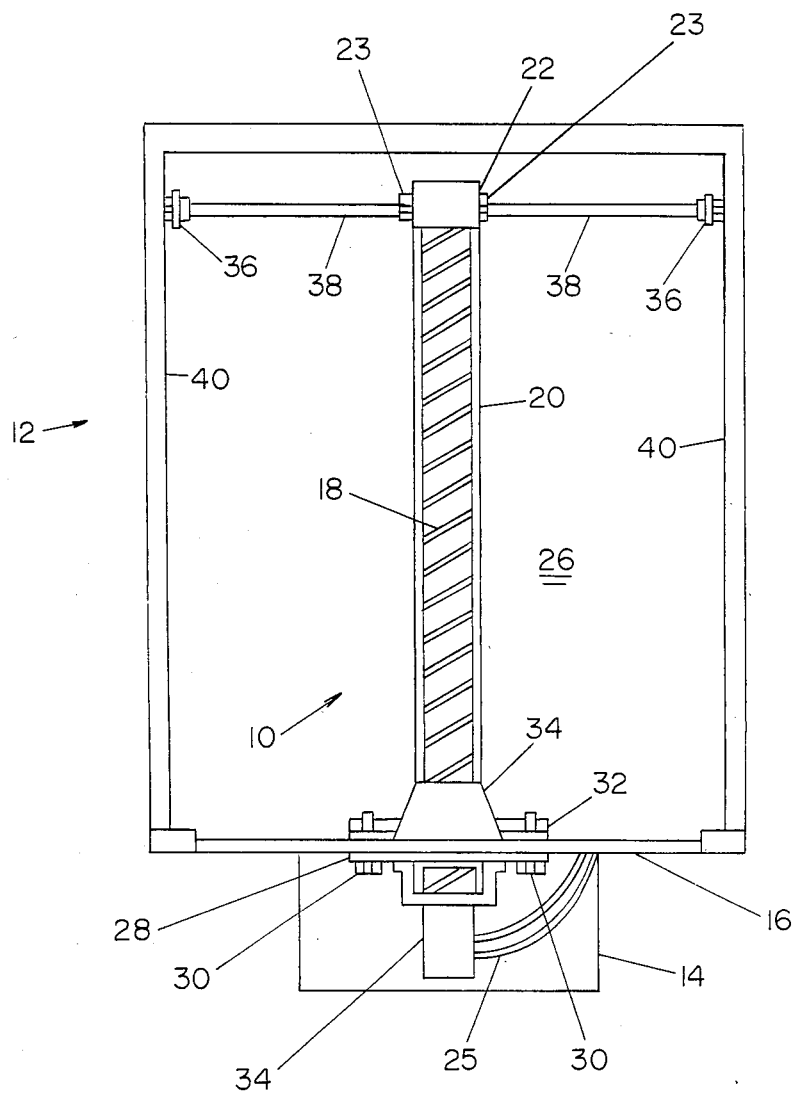
FIG. 1 is a top plan view of an empty dump body of a vehicle with the preferred embodiment unloader installed.

The preferred embodiment of unloader 10 is shown in FIG. 1 in a top view of an empty conventional dump body 12 of a truck (not shown) with a conventional material spinner type spreader 14 attached at the rear tailgate 16 of the dump body.

In the preferred embodiment, unloader 10 consists of screw auger conveyor 18 mounted in base channel 20, held together at one end by fitting 22 and driven by hydraulic motor 24 which is mounted at the rear of dump body 12 and powered through supply lines 25. Screw auger conveyor 18 is uncovered, with no top and only the partial side walls of base channel 20 around it, so it has full access to material within dump body 12. Base channel 20 and screw auger conveyor 18 rest on flat floor 26 of dump body 12.

Unloader 10 is mounted within dump body 12 by being held at three points. At tailgate 16 unloader 10 is installed through the existing rectangular opening known as a "coal chute opening". This opening is normally closed by a vertically sliding door (not shown) which is raised fully to install unloader 10 and then closed down on top of unloader 10 to prevent material leakage.

Unloader 10 is held in the opening by a sandwich type clamp which therefore requires no modification of dump body 12. After unloader 10 is inserted through the opening in tailgate 16, its rear plate 28 is abutted tightly against the sides of the opening and bolts 30 are screwed into threaded holes in backing angle iron 32 which fits under base channel 20 and also extends past the sides of the opening. Angle iron 32 has a small portion of its vertical leg cut away so that it fits under base channel 20. A second matching angle iron (not shown in FIG. 1) can be used above auger terminating cone 34 in a similar manner to make the sandwich clamp arrangement more rigid by clamping both above and below screw auger 18.

At the frontmost end of dump body 12, unloader 10 is held in place in dump body 12 by adjustable press clamps 36 which are attached at the ends of outrigger struts 38. Outrigger struts 38 are attached to auger end fitting 22 by hinges 23 and extend out to almost touch inside walls 40 of dump body 12. Hinges 23 permit outrigger struts 38 to move upward for ease of installation, but they restrict downward motion.

At the end of each outrigger strut 38, press clamp 36 is used to press tightly against essentially parallel inside walls 40 and thereby prevent unloader 10 from moving either upward or laterally.

Figure 2:
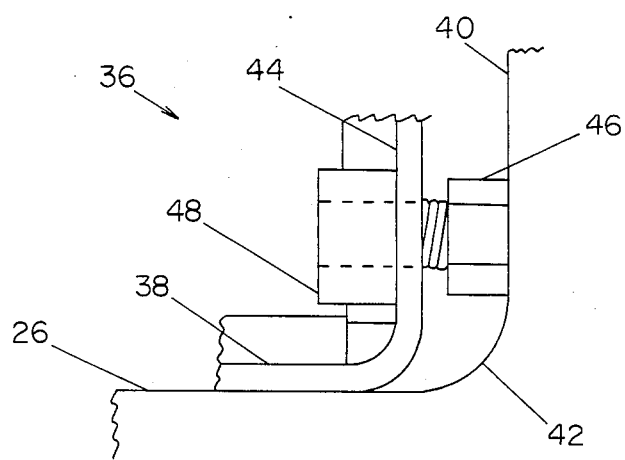
FIG. 2 is a side view of the pressure clamp of the preferred embodiment which holds the unloader against the sides of the dump body.

FIG. 2 shows the construction of press clamp 36 in greater detail. Outrigger strut 38 is bent upward from its horizontal position in contact with dump body floor 26 at a location somewhat short of contact with inside wall 40. This arrangement accommodates to the typical construction of dump truck bodies in which lower joints 42 usually are rounded or have a weld bead.

Upward leg 44 of outrigger strut 38, which is typically constructed of angle iron, is formed to a length sufficient to locate threaded bolt 46 well above rounded joint 42 to permit bolt 46 to act upon a flat portion of sidewall 40. Threaded fitting 48 is attached to upward leg 44 of outrigger strut 38 to mate with and support bolt 46.

Thus, when bolt 46 and the matching bolt on the opposite outrigger are turned to move out of their respective fittings 48, they press tightly against the sides of the dump body and lock the entire unloader in place against sidewise or vertical movement.

Figure 3:
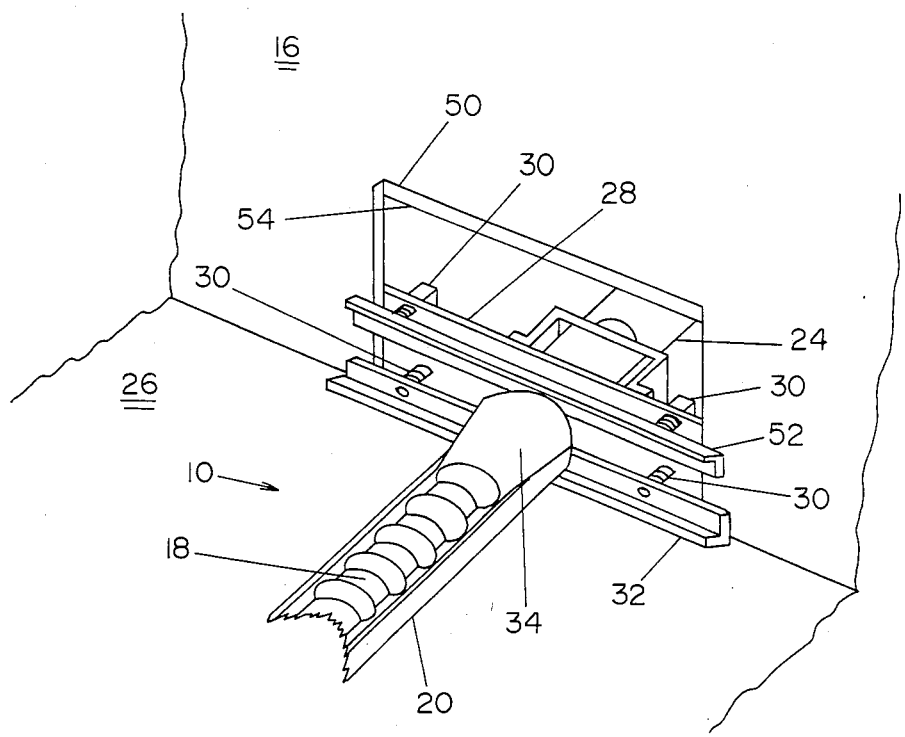
FIG. 3 is a view of the rear clamp of the preferred embodiment.

FIG. 3 is a detailed view of the rear clamp assembly of unloader 10 as seen from inside truck dump body 12. Unloader 10 is seen clamped within coal chute opening 50 in tailgate 16 and resting on flat floor 26. Screw auger conveyor 18 located within base channel 20 extends into the truck body and is rigidly attached to rear plate 28 when unloader 10 is constructed. Drive motor 24 is mounted on the far side of rear plate 28 and projects behind tailgate 16.

Unloader 10 is held within opening 50 by a simple "sandwich" clamp formed with angle irons 32 and 52 on the inside of tailgate 16 and rear plate 28 on the outside of tailgate 16. Angle iron 32 rests on floor 26, passes under terminating cone 34 of unloader 10 and is held tightly against the inside surface of tailgate 16 by bolts 30. Bolts 30, which also hold top angle iron 52 in place and against tailgate 16, pass through rear plate 28 and screw into threaded holes in angle irons 32 and 52. Together, angle irons 32 and 52 and rear plate 28, when tightly bolted together, clamp unloader 10 rigidly in place in opening 50. Moreover, rear plate 28 furnishes a straight top edge against which vertically sliding gate 54 may be lowered in order to seal tailgate 16 so that no material leaks out during use.

The unique rear and side clamps which hold unloader 10 within truck dump body 12 permit the unloader to be installed within a standard, unmodified, dump truck in only minutes and to remove it in a similarly short time. Any dump truck is therefore available for emergency use and, even more important, virtually the entire volume of the truck can be utilized before returning for reloading. The present invention therefore furnishes an economical system which yields more efficient utilization of vehicles and manpower.

Moreover, it should be appreciated that the length of screw auger 18 and its proximity to the front wall of dump body 12 is not critical. If the auger ends short of the wall, the occasional lifting of the dump body will still level the load well enough to empty virtually the full load with unloader 10.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, conveyor systems other than the screw auger of the preferred embodiment could be used, such as a drag chain conveyor.

What is claimed as new and for which Letters Patent of the United States are desired to be secured is:

1. A conveyor unloader for use in unmodified truck bodies comprising:

a conveyor means located on a floor of a truck body, extending from a first wall of the truck body into the interior of the truck body, with one part of the conveyor means penetrating the first wall of the truck body through an opening larger than the part of the conveyor means which fits through it;

a clamp means attached to the conveyor means near the point of the conveyor means which penetrates the first wall of the truck body, the clamp means comprising:

a plate means attached to the conveyor means, the plate means being oriented in a plane transverse to the conveyor means, having at least one dimension large enough so that it spans the opening through which the conveyor means penetrates and extends beyond the edges of the opening, and having at least two holes located so that with the plate means abutted against the first wall, the holes in the plate means are within the outline of the opening in the first wall;

at least one backing means with a dimension such that it also spans and extends beyond the edges of the opening through which the conveyor means penetrates with holes in the backing means that match the orientation of at least two holes in the plate means when the backing means is abutted against the opposite surface from the surface of the first wall against which the plate means is abutted; and fasteners penetrating matching holes in the plate means and the backing means and creating a force to pull the two together to clamp the plate means and the backing means around the edges of the opening through which the conveyor means penetrates the first wall;

at least two outrigger struts attached to the conveyor means at a location remote from the clamp means, the struts extending transverse to the conveyor means and having ends approaching a second wall and a third wall of the truck body, the second and third walls including surfaces, at least parts of which are essentially parallel to each other; and press means attached at the ends of the struts which approach the second and third walls, the press means adjustably extending to contact the second and third walls, to press against the second and third walls at their surfaces which are essentially parallel and to create opposing forces which hold the conveyor means in its location.

2. The conveyor unloader of claim 1 wherein the conveyor means is a screw auger.

3. The conveyor unloader of claim 1 wherein the plate means has an edge which matches the edge of a closure means which closes up any portion of the opening in the first wall which is not blocked off by the plate means.

4. The conveyor unloader of claim 1 wherein the backing means are angle irons cut to span and extend beyond the opening.

5. The conveyor unloader of claim 1 wherein the fasteners are bolts and the holes in the backing means are threaded to match the bolt threads.

6. The conveyor unloader of claim 1 wherein the press means comprises a fixed threaded portion attached to the struts and a matching bolt screwed into the fixed threaded portion, the bolt contacting the wall and varying the total length of the press means as it is turned.

* * * * *